(12) United States Patent  (10) Patent No.: US 7,686,145 B2
Akagi et al.  (45) Date of Patent: Mar. 30, 2010

(54) DRIVE DEVICE FOR ELECTRICALLY MOVABLE VEHICLES AND ELECTRIC WHEELCHAIR HAVING SAME

(75) Inventors: Takayoshi Akagi, Otsu (JP); Takuya Noro, Kusatsu (JP); Kazuhiro Tomoshige, Kasai (JP); Satoshi Komukai, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 356 days.

(21) Appl. No.: 11/523,627

(22) Filed: Sep. 20, 2006

(65) Prior Publication Data
US 2007/0062774 A1 Mar. 22, 2007

(30) Foreign Application Priority Data
Sep. 21, 2005 (JP) ............................. 2005-273266
Aug. 11, 2006 (JP) ............................. 2006-219558

(51) Int. Cl.
*A61G 5/04* (2006.01)
*B60K 1/00* (2006.01)
*F16D 67/06* (2006.01)
*H02K 7/112* (2006.01)

(52) U.S. Cl. .................... 192/13 R; 192/18 B; 192/49; 180/65.51; 180/65.6; 180/907; 310/76

(58) Field of Classification Search ................ 192/69.7, 192/97, 89.27; 310/76, 77, 75 C, 67 A
See application file for complete search history.

(56) References Cited

U.S. PATENT DOCUMENTS

| 5,014,800 A | 5/1991 | Kawamoto et al. |
| 5,161,634 A * | 11/1992 | Ichihara et al. ............. 180/179 |
| 5,246,082 A * | 9/1993 | Alber ........................ 180/65.5 |
| 5,382,854 A | 1/1995 | Kawamoto et al. |
| 5,540,296 A | 7/1996 | Strothmann |
| 5,540,297 A | 7/1996 | Meier |
| 5,600,191 A * | 2/1997 | Yang ........................ 310/67 R |
| 5,762,155 A | 6/1998 | Scheulderman |
| 5,818,134 A | 10/1998 | Yang et al. |
| 5,894,902 A | 4/1999 | Cho |
| 5,964,473 A | 10/1999 | Degonda et al. |
| 6,092,615 A | 7/2000 | Pusch et al. |
| 6,100,615 A | 8/2000 | Birkestrand |
| 6,155,367 A | 12/2000 | Alber |
| 6,158,757 A | 12/2000 | Tidcomb |

(Continued)

FOREIGN PATENT DOCUMENTS

JP 09-123930 A 5/1997

(Continued)

*Primary Examiner*—Richard M. Lorence
(74) *Attorney, Agent, or Firm*—Westerman, Hattori, Daniels & Adrian, LLP

(57) ABSTRACT

A drive device for electric vehicles comprises a casing 30, a motor 40 housed in the casing and having a rotating shaft 42, a housing 50 rotatably fitted around the casing and coupled to the outer end of the rotating shaft of the motor by a reduction gear mechanism 48, a drive wheel 80 provided around the housing and an electromagnetic brake 60 for arresting the rotation of the rotating shaft of the motor at the base end of the shaft. The rotating shaft of the motor is engaged with or disengaged from the electromagnetic brake by a clutch mechanism 70 provided between the shaft and the brake.

13 Claims, 18 Drawing Sheets

U.S. PATENT DOCUMENTS

| | | |
|---|---|---|
| 6,260,645 B1 | 7/2001 | Pawlowski et al. |
| 6,286,616 B1 | 9/2001 | Kutter |
| 6,328,123 B1 | 12/2001 | Niemann et al. |
| 6,355,996 B1 | 3/2002 | Birkestrand |
| 6,494,278 B1 | 12/2002 | Weisz |
| 7,017,694 B2 | 3/2006 | Shirazawa |
| 7,100,747 B1 | 9/2006 | Conrad et al. |
| 7,342,342 B2 | 3/2008 | Naitou et al. |
| 7,350,605 B2 | 4/2008 | Mizutani et al. |
| 7,527,113 B2 | 5/2009 | Jenkins |
| 2006/0087182 A1* | 4/2006 | Sugiyama ............... 310/75 C |
| 2006/0096793 A1* | 5/2006 | Akagi et al. ............... 180/65.1 |

FOREIGN PATENT DOCUMENTS

| | | |
|---|---|---|
| JP | 09-117476 | 6/1997 |
| JP | 9-296829 A | 11/1997 |
| JP | 09-308651 A | 12/1997 |
| JP | 10-248877 A | 9/1998 |
| JP | 2000-014714 A | 1/2000 |
| JP | 2000-70309 A | 3/2000 |
| JP | 2002-085474 A | 3/2002 |
| JP | 2002-349493 A | 12/2002 |
| JP | 3432977 B2 | 8/2003 |
| JP | 2006-116185 A | 5/2006 |

* cited by examiner

F I G. 1 1
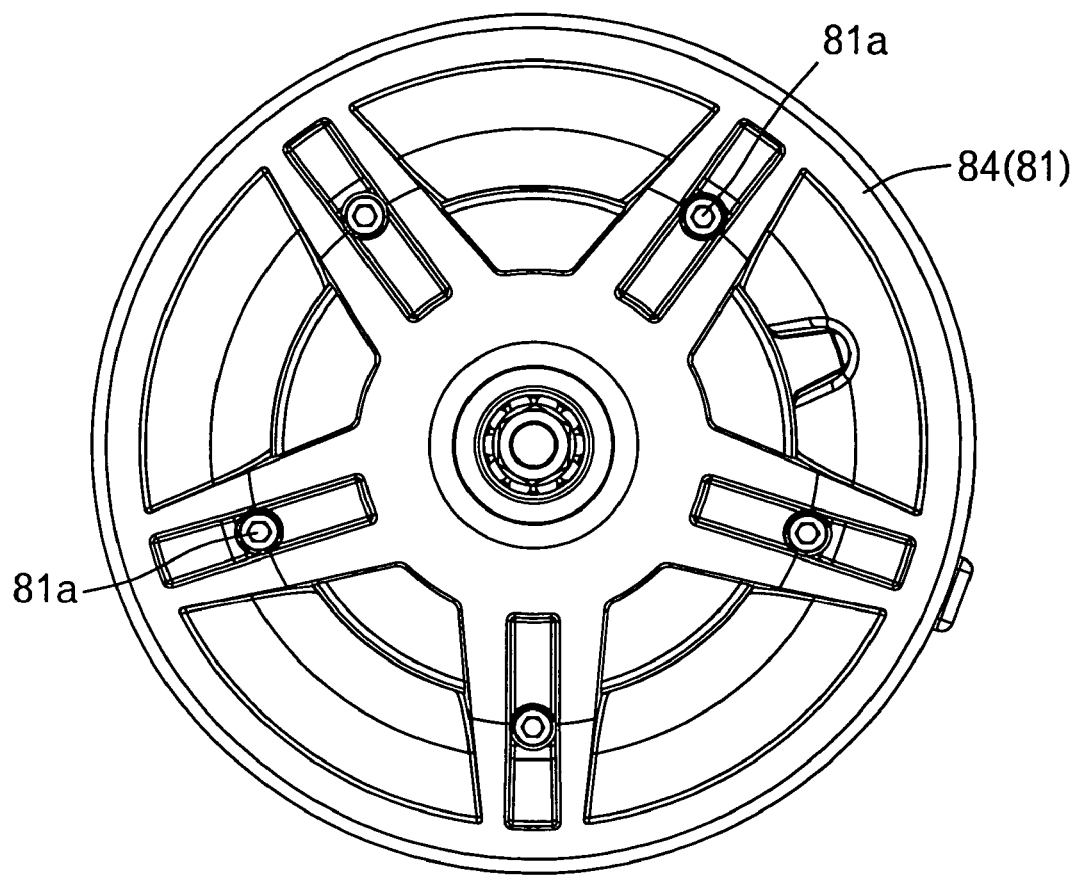

F I G. 18
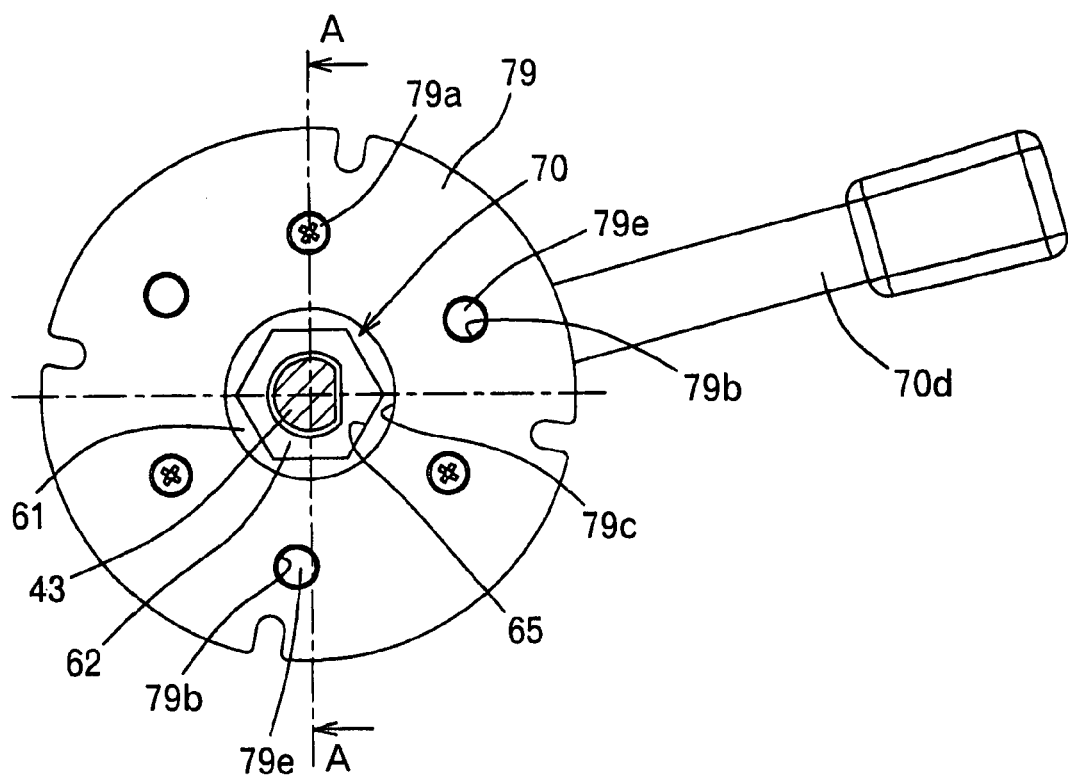

DRIVE DEVICE FOR ELECTRICALLY MOVABLE VEHICLES AND ELECTRIC WHEELCHAIR HAVING SAME

FIELD OF THE INVENTION

The present invention relates to drive devices for use in electrically movable vehicles, i.e., electric vehicles, such as electric wheelchairs, and more particularly to electric vehicle drive devices having a drive wheel around the device and to be mounted on a vehicle.

BACKGROUND OF THE INVENTION

Electric vehicles such as electric wheelchairs include those having a drive device for driving each of left and right drive wheels individually with a motor. The motor is mounted on the vehicle body and delivers torque to the axle of the drive wheel to rotate the drive wheel. See, for example, JP1997-296829A and JP2000-70309A.

To give a reduced thickness to the drive device, it is required to enlarge the drive device diametrically of the drive wheel, and it is consequently impossible to diminish the drive wheel in diameter. An increase in the diameter of the drive wheel entails the problem that greater motor torque acts on the drive wheel under the same load. In the case of electric wheelchairs, furthermore, the increase in the diameter of the drive wheel gives rise to the problem that the drive wheel is liable to become an obstacle when the wheelchair is driven indoors, or when the user moves from the wheel chair to the bed or from the bed to the wheelchair.

With the drive devices disclosed in the above publications and having a reduced thickness, the motor and the electromagnetic brake are dynamically cut off from the drive wheel when the clutch mechanism is disengaged. If the clutch mechanism is disengaged, for example, on a downward slope in error, the dynamic braking force of the motor and the braking force of the brake fail to act on the drive wheel, possibly permitting the wheelchair to run down the downward slope as accelerated.

SUMMARY OF THE INVENTION

In order to deal with the problem involved in the increase in the drive wheel diameter, we have made an attempt to give a reduced diameter to the drive wheel. Although the reduction in the drive wheel diameter fails to give a smaller thickness to the drive device, the center of the drive wheel can be positioned at a lower level. We have therefore found that even if the drive device is designed with the drive wheel projecting inward, the position of projection can be made lower than the vehicle seat for the user to sit in, making it possible to hold the wheel out of contact with the seat.

Further to handle the problem that the dynamic braking force of the motor fails to act on the drive wheel when the clutch mechanism is in a disengaged state, we have found out a construction enabling the motor to exert a dynamic braking force on the drive wheel even if the clutch mechanism is held disengaged.

To overcome the above problems, the preset invention provides a drive device of motor vehicles which comprises:

a casing, a motor housed in the casing and having a rotating shaft, a housing rotatably fitting around an outer periphery of the casing and coupled to an outer end of the rotating shaft of the motor by a reduction gear mechanism, a drive wheel provided around an outer periphery of the housing, and an electromagnetic brake for arresting the rotation of the rotating shaft of the motor at a base end of the shaft, a clutch mechanism being disposed between the rotating shaft of the motor and the electromagnetic brake for engaging the rotating shaft with the brake or disengaging the shaft from the brake.

With the drive device of the invention, the electromagnetic brake is engageable with or disengageable from the rotating shaft of the motor by a clutch mechanism, so that the drive wheel coupled to the motor is rotatable even when the brake is in operation. Since the motor rotating shaft is not cut off dynamically from the drive wheel at this time, the motor exerts a dynamic braking force or like braking force on the drive wheel even when the brake is prevented from acting on the motor by disengaging the clutch mechanism. Thus, with the dynamic braking force or like braking force of the motor acting on the drive wheel, the drive wheel is unlikely to rotate freely.

Accordingly, when the vehicle is held at a halt by the electromagnetic brake as on a downward slope and if the clutch mechanism is then disengaged, the dynamic braking force or like braking force of the motor obviates the likelihood that the vehicle will be accelerated to a speed over a given value, hence enhanced safety.

The present invention further provides a control device for electric vehicles which comprises:

a casing supported at one end thereof by an axle on the electric vehicle, a motor housed in the casing and having a rotating shaft in alignment with the axle, a housing rotatably fitting around an outer periphery of the casing and coupled to an outer end of the rotating shaft of the motor by a reduction gear mechanism, a drive wheel provided around an outer periphery of the housing, and an electromagnetic brake for arresting the rotation of the rotating shaft of the motor at a base end of the shaft, a clutch mechanism being disposed between the rotating shaft of the motor and the electromagnetic brake for engaging the rotating shaft with the brake or disengaging the shaft from the brake.

The axle supporting the drive device thereon is provided in alignment with the rotating shaft of the motor, with the clutch mechanism also in alignment with the axle and the rotating shaft. This arrangement makes the drive device itself compact, further making it possible to give a smaller diameter to the drive wheel to be provided around the outer periphery of the drive device. The arrangement wherein the rotating shaft and the drive wheel have the same center of rotation obviates unbalanced reaction, enabling the axle as aligned with the shaft to receive the reaction in good balance.

The present invention further provides a drive device for electric vehicles which comprises:

a casing housing a motor therein and attached to a frame of the electric vehicle, a motor rotating shaft rotatably projecting from the casing, a housing coupled to the rotating shaft by a reduction gear mechanism, a drive wheel provided around an outer periphery of the housing, and an electromagnetic brake for arresting the rotation of the motor rotating shaft, the motor rotating shaft extending through the frame of the electric vehicle when the casing is attached to the vehicle frame, the electromagnetic brake, or the electromagnetic brake and a clutch mechanism being mounted on the portion of the rotating shaft extending through the vehicle frame and projecting outward beyond the frame.

With the drive device of the invention, the electromagnetic brake is disposed outside the casing, or the brake and the clutch mechanism are arranged externally of the casing, with the frame positioned between the casing and the assembly of the brake and clutch. This arrangement serves to reduce the weight of the casing side projecting from the frame, further diminishing the length of the outward projection.

With the electromagnetic brake, or the brake and the clutch mechanism disposed externally of the casing, the amount of wiring to be led into the casing can be diminished. The components to be provided inside the casing can be made simple in construction to ensure improved durability.

If the motor and the electromagnetic clutch are arranged close to each other, the heat generated in the motor will be transmitted to the brake to heat the brake to a higher temperature, with the result that the magnetic flux to be produced by the passage of the same amount of current is likely to become smaller. With the drive device described above, however, the brake is positioned away from the motor. The heat to be generated by the motor therefore will not be transmitted to the brake almost entirely. This eliminates the likelihood that the brake will be heated to a higher temperature to diminish the magnetic flux to be produced by the passage of the same amount of current, permitting the brake to retain its performance.

Additionally, the rotating shaft and the drive wheel have the same center of rotation. This obviates the likelihood of the reaction becoming unbalanced.

BRIEF DESCRIPTION OF THE DRAWINGS

FIG. 11 is a front view of the drive device of the second embodiment;

FIG. 18 is a front view of the electromagnetic brake and clutch mechanism;

DESCRIPTION OF THE PREFERRED EMBODIMENTS

Embodiments will be described below with reference to an electric wheelchair 10 serving as an electric vehicle and to be used by elderly or disabled persons as by a person having trouble with his or her leg, whereas the present invention is applicable also to other electric vehicles such as golf carts or small vehicles.

First Embodiment

Figure 1:
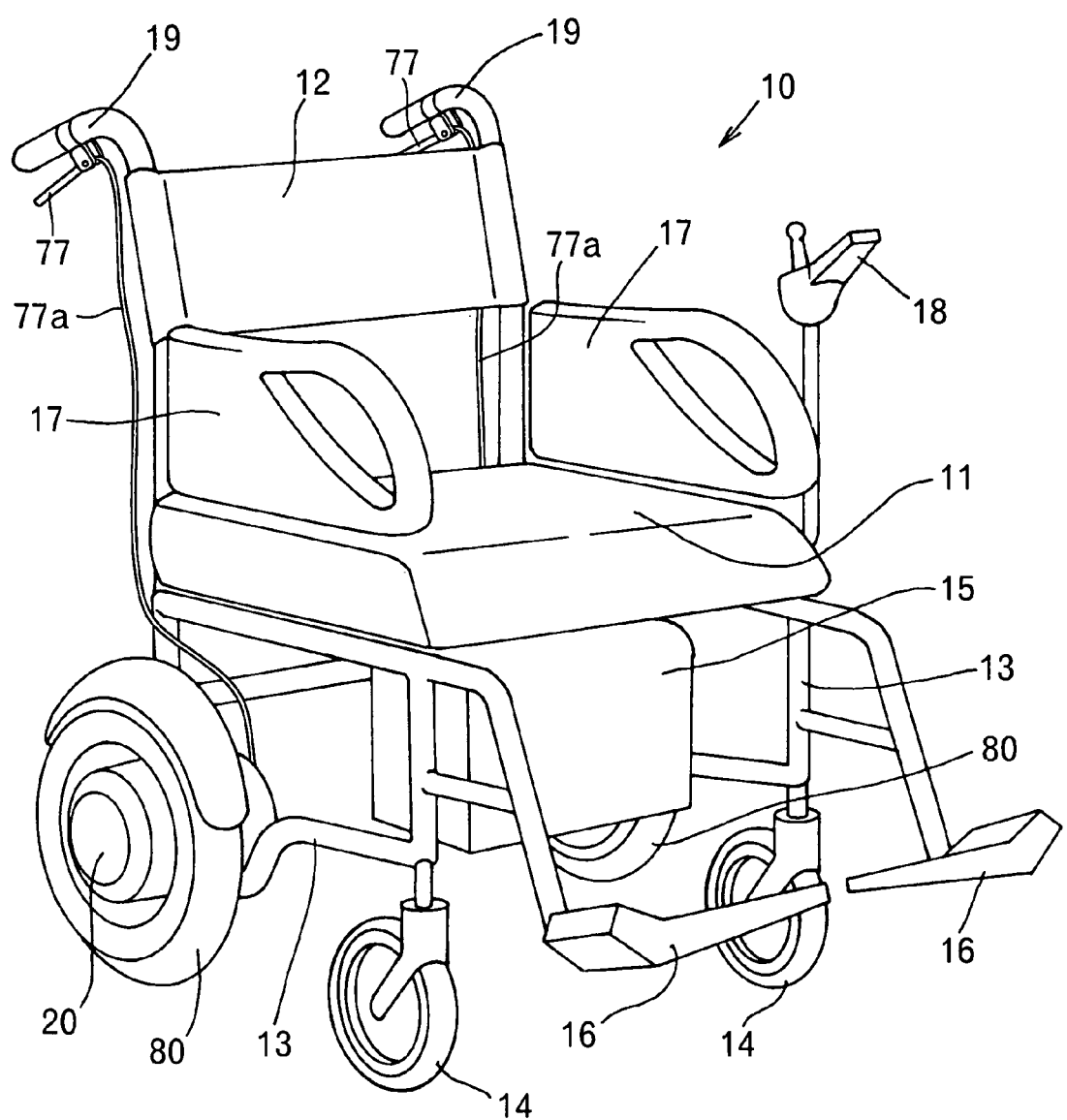
FIG. 1 is a perspective view of an electric wheelchair of a first embodiment.

FIG. 1 is a perspective view of the electric wheelchair 10, which comprises a pair of drive devices 20, 20 of the invention provided respectively at the left and right sides thereof. The wheelchair 10 comprises a seat 11 for the user to sit in, and a backrest 12. Extending downward from the seat 11 is a frame 13 provided with the left and right drive devices 20, 20. Positioned to the front of drive wheels 80, 80 on the respective drive devices 20, 20 are auxiliary wheels 14, 14 supported by the frame 13 and having a smaller diameter than the drive wheels 80, 80.

Disposed under the seat 11 is a control box 15 having a battery, power controller and other control means. Footrest pedals 16, 16 are arranged in front of and below the seat 11, and a pair of armrests 17, 17 are provided on opposite sides of the seat 11. A control device 18 to be manipulated by the user is provided on one side of one of the armrests 17. Extending rearward from the upper portion of the backrest 12 are handles 19, 19 for the help.

Each handle 19 is provided with a clutch controller 77 (to be described later) for the help to use for engaging or disengaging a clutch mechanism 70.

The control device 18 can be, for example, of the joystick type for varying the speed of the wheelchair 10 and turning the wheelchair 10. The wheelchair 10 can be advanced or moved backward by inclining the joystick forward or backward. The wheelchair 10 can be turned leftward or rightward by inclining the joystick leftward or rightward to thereby vary the rotational speeds of the drive wheels 80, 80.

Figure 2:
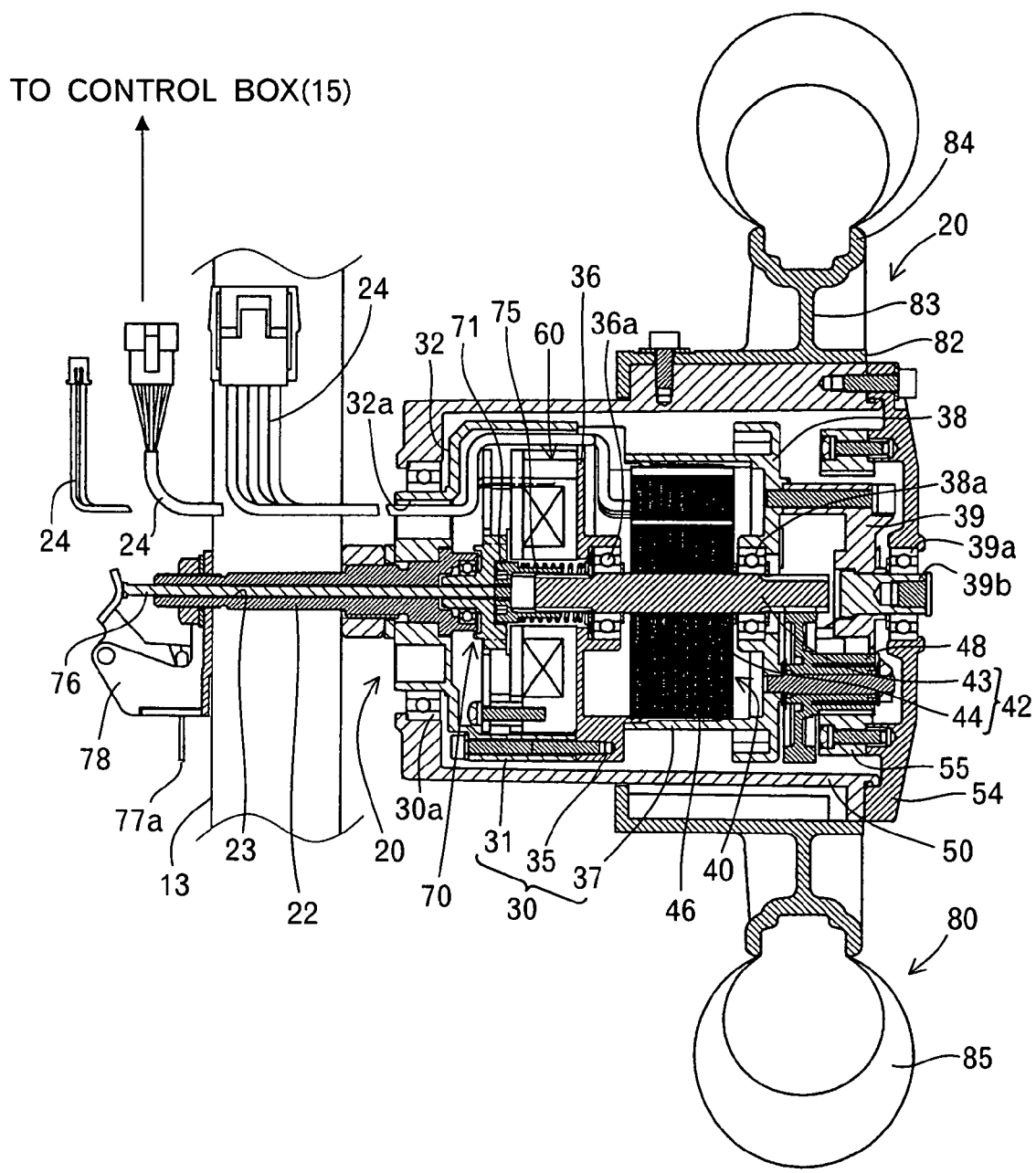
FIG. 2 is a view in section of a drive device and drive wheel according to the first embodiment.
Figure 3:
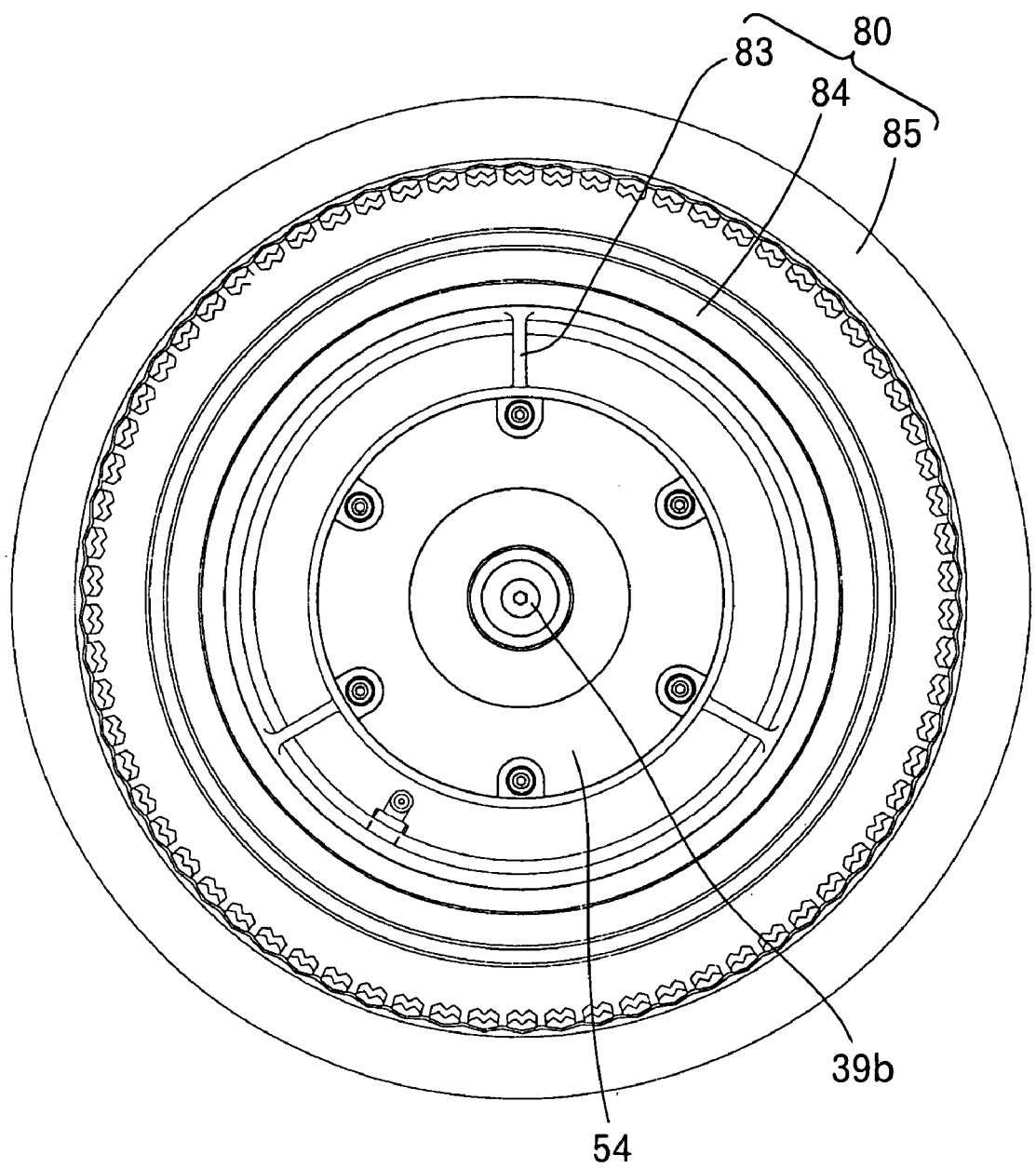
FIG. 3 is a side elevation of the drive wheel.

FIG. 2 is a sectional view of the drive device 20 of the invention and the left drive wheel 80 attached to the drive device 20. FIG. 3 is a side elevation of FIG. 2 as it is seen from the left.

The drive device 20 comprises a casing 30 which is provided with an axle 22 projecting therefrom toward the frame 13 of the wheelchair 10 and mounted on the frame 13, a motor 40 disposed in the casing 30, a housing 50 coupled to the rotating shaft 43 of the motor 40 by a reduction gear mechanism 48 and freely rotatable relative to the casing 30, an electromagnetic brake 60 for brakably coupling the rotating shaft 43 of the motor 40 to the casing 30, and the clutch mechanism 70 by which the rotating shaft 43 of the motor 40 is engaged with or disengaged from the brake 60 The drive wheel 80 is fitted around the drive device 20.

It is desired that the casing 30 and the housing 50 be made from a metal material having high thermal conductivity, such as an aluminum alloy, so as to be improved in heat radiating characteristics.

The axle 22 has a threaded base end portion which is secured to the frame 13 with a bolt. Extending through the center of the axle 22 is a rod bore 23 having slidably fitted therein a push rod 76 for operating the clutch mechanism 70 to be described later.

The casing 30 which is supported at one end thereof by the axle 22 on the frame 13 can be of a construction comprising three components as divided axially thereof. An inner casing member 31 positioned closer to the frame 13 is closed at one end thereof with an end plate 32 having fixed thereto the outer end of the axle 22. The other end of the casing member 31 is left open. The axle 22 can be attached to the inner casing member 31 by a press fit.

A middle casing member 35 has one end fixed to the inner casing member 31 and an inner periphery provided with an annular plate 36 extending toward the rotating shaft 43 of the motor 40. A bearing 36a rotatably supporting the rotating shaft 43 thereon is provided on the inner peripheral edge of the annular plate 36. The annular plate 36 has the electromagnetic brake 60 attached to the inner casing member side thereof and the stator 46 of the motor 40 fixed to the rear side thereof.

An outer casing member 37 has one end fixed to the middle casing member 35 and surrounds the outer periphery of the stator 46. The other end of the outer casing member 37 is provided with an annular end plate 38. A bearing 38a rotatably supporting the rotating shaft 43 of the motor 40 thereon is provided on the inner peripheral edge of the end plate 38. The reduction gear mechanism 48 is mounted on the outer side of the end plate 38.

For example, the reduction gear mechanism 48 can be a planetary gear mechanism. The reduction gear mechanism 48 is provided between and supported by the end plate 38 of the outer casing member 37 and a holding plate 39 opposed and fixed to the end plate 38. The reduction gear mechanism 48 is in mesh with an internal gear 55 formed on the inner side of a closure 54 closing the outer end of the housing 50.

When the rotor 42 is rotated by the energization of the stator 46, the torque is delivered to the closure 54 through the reduction gear mechanism 48 and the internal gear 55 to rotate the housing 50.

The housing 50 has one end closer to the frame 13 and supported by a bearing 30a on the inner casing member 31. The opening of the other housing end is closed with the closure 54.

The closure 54, which has the internal gear 55 as described above, is rotatably supported by a bearing 39a on a shaft 39b projecting from the center of the holding plate 39.

As shown in FIGS. 2 and 3, the drive wheel 80 can be composed of a tubular hub case 82 fitting around the housing 50 of the drive device 20 and rotatable therewith, a plurality of spokes 83 projecting from the outer periphery of the hub case 82, an annular rim 84 interconnecting the outer ends of the spokes 83 and a rubber tire 85 fitting around the rim 84.

Preferably, the drive wheel 80 is so positioned that the drive device 20 will not project outward beyond the tire 85. According to the present embodiment, the spokes 83 are positioned toward the outer end of the hub case 82 away from the axle 22 to thereby diminish the amount of projection of the drive device 20 beyond the tire 85.

Wiring 24 for energizing the stator 46 and the brake 60 therethrough extends through the end plate 32 of the inner casing member 31 as at 32a to the control box 15 under the seat 11.

The motor 40 has a rotor 42 which comprises the rotating shaft 43 supported by the bearings 36a, 38a in alignment with the axle 22, and a stack of metal plates 44 fittingly mounted on the shaft 43 so as to be opposed to the stator 46.

The outer end of the rotating shaft 43 is in mesh with the reduction gear mechanism 48. The rotation of the shaft 43 is delivered to the drive wheel 80 through the reduction gear mechanism 48.

Figure 4:
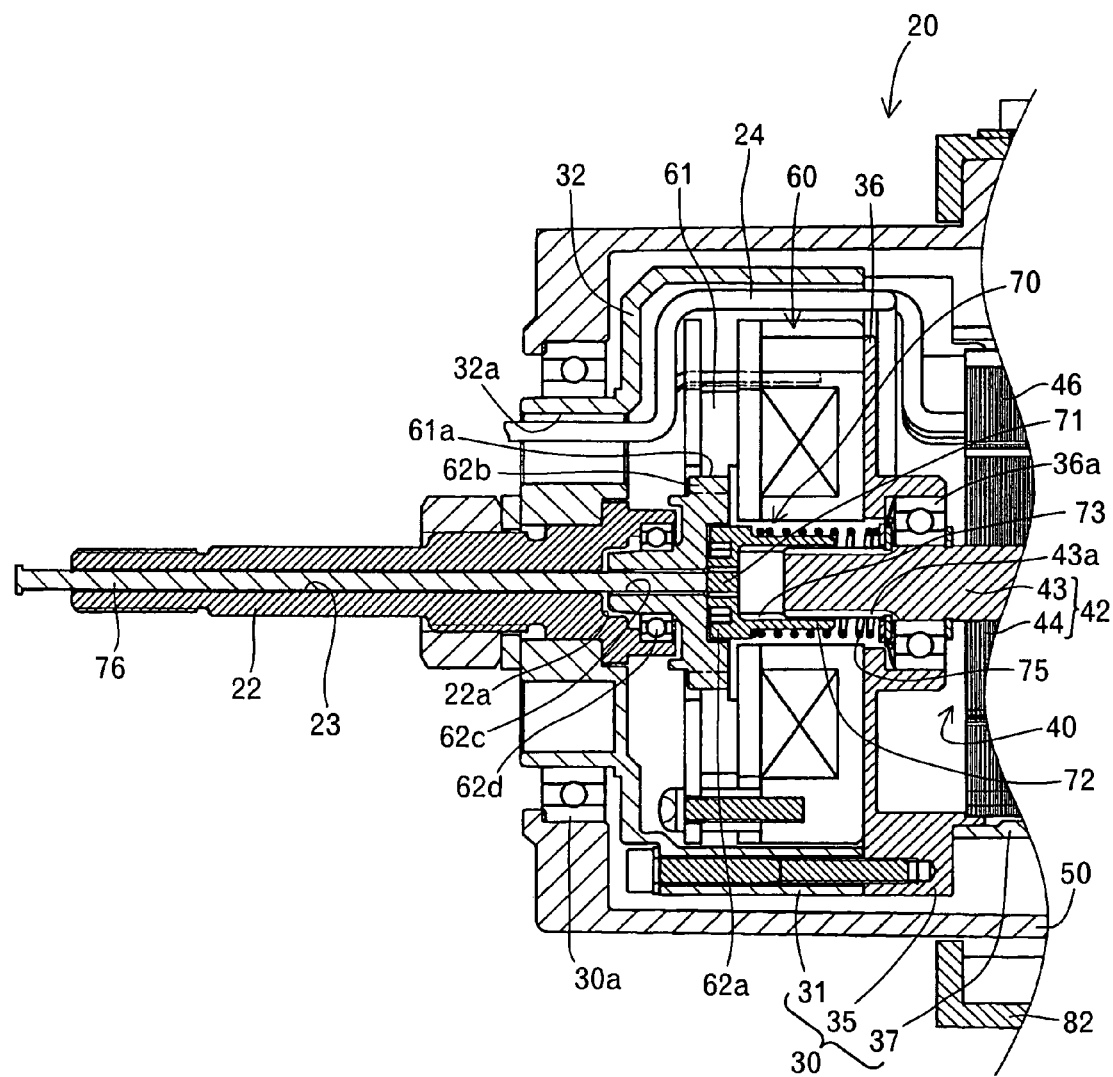
FIG. 4 is an enlarged view in section of a clutch mechanism and the vicinity thereof.

The rotating shaft has one end closer to the frame and extends through the brake 60 as shown in FIG. 4 and has a base end disengageably connected to an inner driver 62 of the brake 60 by the clutch mechanism 70.

FIG. 4 is an enlarged sectional view of the clutch mechanism 70 and the vicinity thereof. As shown in this drawing, the rotating shaft 43 has a splined shaft portion 43a at its base end. The clutch mechanism 70 has a movable piece 71 fitting around the base end of the shaft 43.

Figure 5:
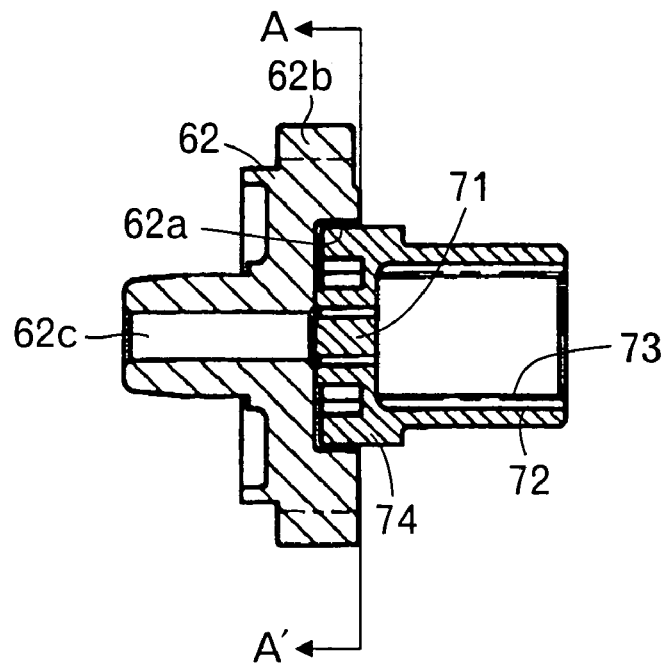
FIG. 5 is a sectional view showing a movable piece and an inner driver as they are removed.

The movable piece 71 has a tubular portion 72 closed at one end and open at the other end as shown in FIGS. 4 and 5. The inner periphery of the tubular portion 72 is splined as indicated at 73. The splined inner periphery 73 is fitted around the splined shaft portion 43a of the rotating shaft 43 to make the movable piece 71 rotatable with the rotating shaft 43. The tubular portion 72 is closed at its base end, the outer periphery of which provides a meshable clutch portion 74 (see FIG. 6).

The movable piece 71 can be made, for example, from a carbon steel (such as S45C) for mechanical structures, as refined. The portions of the shaft 43 and the movable piece 71 to be in mesh with each other are preferably coated with a solid lubricant to give improved slidability and higher abrasion resistance, because if a fluid lubricant, such as an oil or grease, is used as a lubricant, the fluid lubricant will spatter to impair the braking performance of the brake 60 when the motor 40 is rotated.

Provided between the movable piece 71 and the annular plate 36 of the middle casing member 35 is biasing means 75 comprising a coil spring for biasing the movable piece 71 away from the rotating shaft 43.

Figure 6:
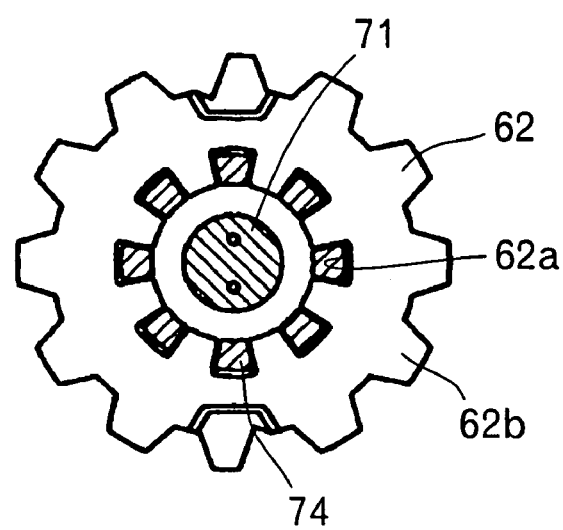
FIG. 6 is a view in section taken along the line A-A' in FIG. 5.

The meshable clutch portion 74 provided on the outer periphery of base end of the movable piece 71 is disengageably engaged in the inner driver 62 of the electromagnetic brake 60. FIGS. 5 and 6 show the movable piece 71 as engaged with the inner driver 62. As illustrated, the inner driver 62 has a meshable clutch portion 62a formed inside thereof and engageable with the movable piece 71, and an outer periphery splined as at 62b and engageable with the brake disk 61 of the brake 60 to be described later so as to be rotatable with the disk.

It is desirable that the meshable portions of the inner driver 62 and the movable piece 71 be also coated with a solid lubricant so as to ensure improved slidability and higher abrasion resistance and to preclude impairment of braking performance of the brake 60 due to the spattering of lubricant.

As shown in FIG. 4, the inner driver 62 is rotatably fitted in a cavity 22a formed in the outer end of the axle 22, with a bearing 62d provided in the cavity around the driver. The push rod 76 for operating the clutch mechanism 70 slidably extends through a rod bore 62c formed in the inner driver 62 centrally thereof.

The splined outer peripheral portion 62b of the inner driver 62 is in engagement with the brake disk 61 of the brake 60. The brake disk 61 has an inner periphery splined as at 61a and engaged with the splined outer peripheral portion 62b of the inner driver 62.

Figure 15:
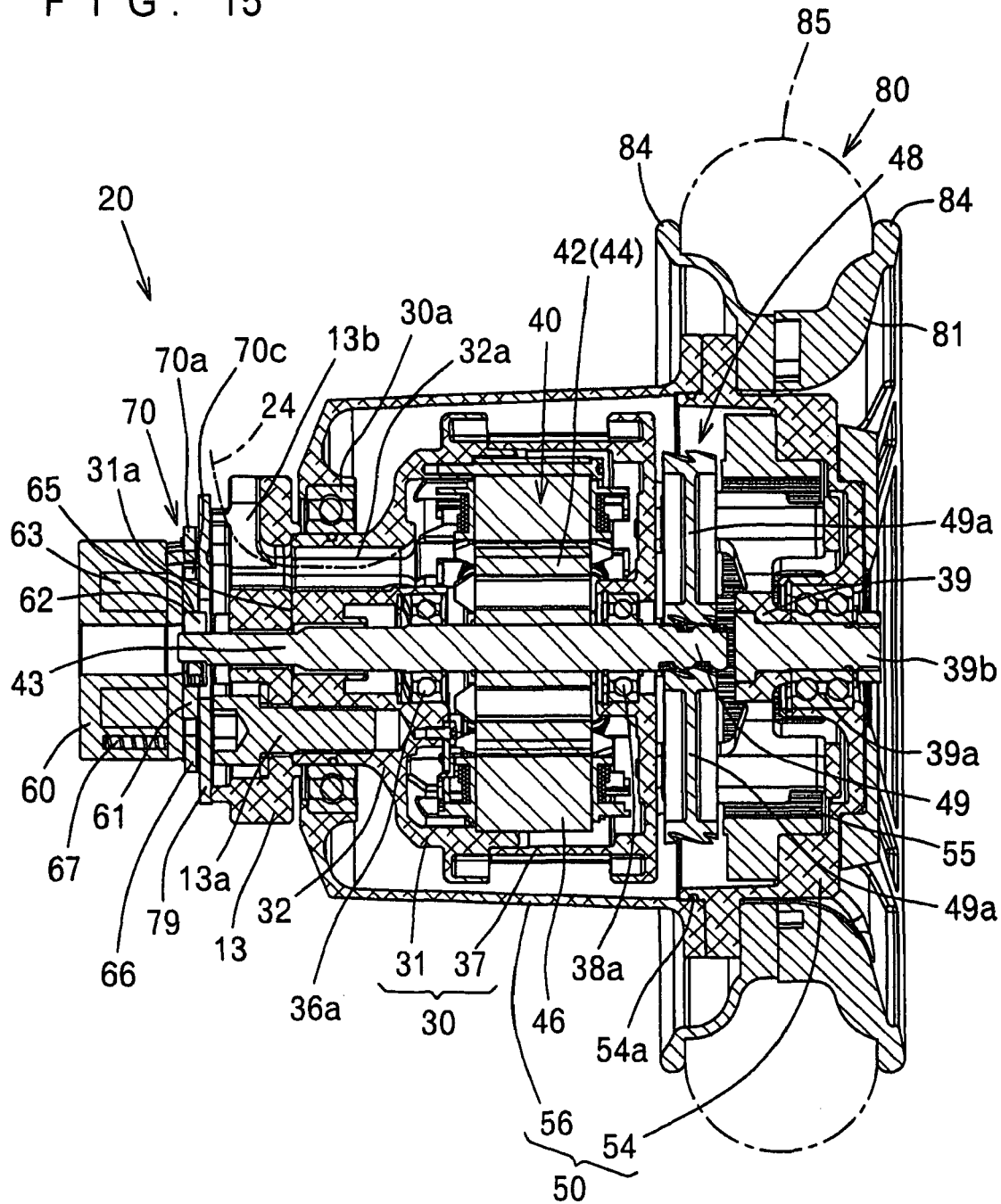
FIG. 15 is a view in section taken along the line A-A in FIG. 13.

The brake disk 61 is included in the electromagnetic brake 60. The brake 60 can be a known one which is actuated in a deenergized state. When the brake 60 is energized, a coil 63 (as shown in FIG. 15) is energized to deactivate the brake, while when the coil is deenergized, the force of spring applies pressure to the brake disk 61 to directly brake the rotating shaft 43. This ensures a braking action at the time of deenergization.

The clutch mechanism 70 is engaged or alternatively disengaged by the push rod 76 extending through the axle 22 and the inner driver 62 as shown in FIGS. 2, 4, 7 and 8. The push rod 76 has an outer end in contact with the movable piece 71, and a base end coupled to a push mechanism 78 for slidingly pushing the rod 76 toward the rotating shaft 43 as seen in FIG. 2. The push mechanism 78 can be, for example, a known bell crank mechanism, which can be operated with a wire 77a. The outer end of the wire 77a is connected to the clutch controller 77 which is disposed at a position accessible by the user or the help who assists in moving the electric wheelchair 10. For example, the clutch controller 77 is adapted to pull the wire 77a when manipulated by the help and return the wire 77a when released from the hand in the manner of the bicycle brake lever as shown in FIG. 1.

Figure 7:
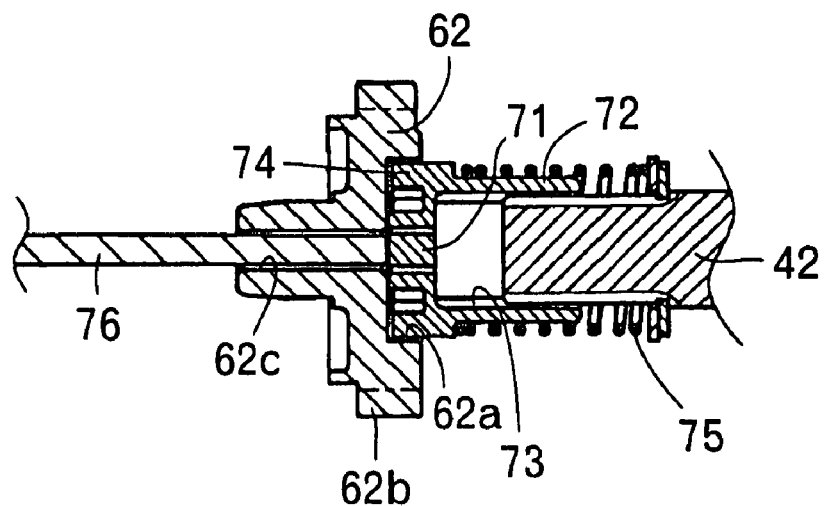
FIG. 7 is a sectional view showing the inner driver and the movable piece as engaged therewith.
Figure 8:
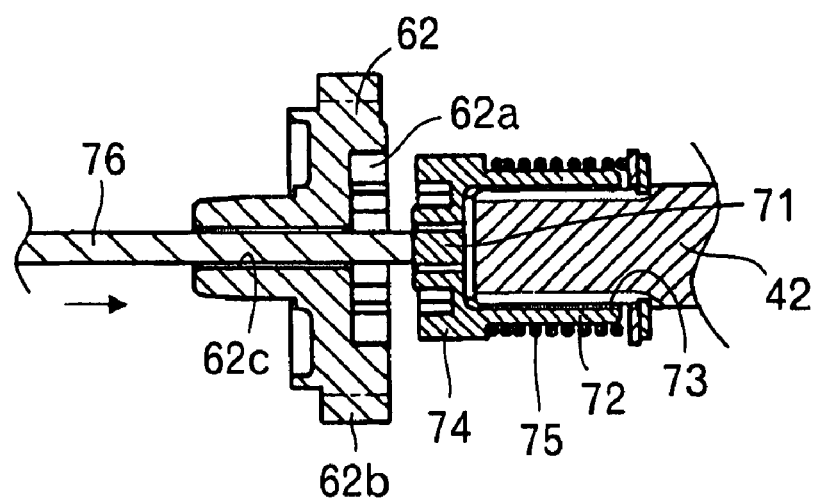
FIG. 8 is a sectional view showing the inner driver and the movable piece as disengaged therefrom.

When the clutch controller 77 is manipulated by the user or help, the wire 77a is pulled, causing the push mechanism 78 to force the push rod 76 toward the rotating shaft 43. The rod 76 pushes the movable piece 71, engaged with the inner driver 62 by the biasing means 75 as shown in FIG. 7, toward the rotating shaft 43, disengaging the movable piece 71 out of engagement with the inner driver 62 as seen in FIG. 8. Consequently, the brake 60 ceases acting on the drive wheel 80 regardless of whether the brake 60 is turned on or off.

According to the present invention, the rotating shaft 43 of the motor 40 is always coupled to the drive wheel 80, so that when energized, the motor 40 serves as a generator, effecting regenerative braking to pass DC current to the control box 15, namely, applying a dynamic braking force of the motor 40 to the drive wheel 80 as a load, even if the drive wheel 80 is free of the action of the electromagnetic brake 60. The wheel 80 is therefore not free to rotate. Accordingly, even when the drive wheel 80 is disconnected from the brake 60 by the action of the clutch mechanism 70, a given load of resistance is offered to the rotation of the wheel 80, which is therefore unlikely to become accelerated even on a downward slope.

The control means in the control box 15 is adapted to judge whether the speed of the drive wheel 80 is increasing or decreasing at this time with reference to a speedometer for detecting the rotational speed of the wheel 80. When the result of judgment indicates a speed increase, the control means of the control box 15 short-circuits the wiring of the stator 46 to increase the above-mentioned load of resistance of the motor 40 by short-circuit braking to produce an increased braking force. Even if the control means still recognizes an increase in the speed on the speedometer, the control means reverses the direction of rotation of the motor 40 for plugging. The control means may be adapted to reduce the speed in this way by multistage braking.

When the clutch mechanism 70 is disengaged to disconnect the electromagnetic brake 60 as actuated, the drive wheel is released from the braking force of the brake 60, so that the clutch mechanism 70 can be utilized also when the wheelchair is pushed forward by the help manually.

When the push rod 76 is pulled back by manipulating the wire 77a, with the brake 60 disconnected from the rotating shaft 43 (FIG. 8), the biasing force of the biasing means 75 pushes the movable piece 71 toward the inner driver 62, bringing the movable piece 71 into engagement with the inner driver 62 again as shown in FIG. 7. When the brake 60 is turned on with the movable piece 71 in engagement with the inner driver 62, the brake 60 acts to brake the rotation of the rotating shaft 43 to prevent the rotation of the drive wheel 80.

The drive device 20 thus constructed is secured to the electric wheelchair 10, with the axle 22 supported at one end thereof by the frame 13. When the electric wheelchair 10 is to be used without making the drive device 20 removable therefrom, the drive device 20 may be fastened to the frame 13 as with a bolt, whereas if there is a need to remove the drive device 20 along with the drive wheel 80 as fitted therearound, for example, to carry the wheelchair 10 on a motor vehicle, a structure may be provided for preventing the axle 22 from slipping off from the frame 13 axially thereof so as to render the drive device removable easily. When required, a member may be provided for receiving the reaction force of torque of the motor 40.

When the user gives a command to advance, retract or turn the electric wheelchair 10 by the control device 18, each electromagnetic brake 60 is energized and thereby deactivated, and each stator 46 is energized to rotate the rotor 42. When the rotor 42 is rotated, a drive force is delivered from the rotating shaft 43 to the housing 50 by way of the reduction gear mechanism 48 and the internal gear 55 to rotate the housing 50. This rotates the drive wheel 80 secured to the housing 50. Thus, the electric wheelchair 10 is advanced or retracted. The wheelchair 10 is turned by varying the rotational speeds of the left and right drive devices 20.

While the clutch mechanism 70 is not manipulated by the help, the rotating shaft 43 of the motor 40 is connected to the inner driver 62 of the electromagnetic brake 60 by the biasing force of the biasing means 75 as shown in FIG. 7 for rotation therewith. When the brake 60 is actuated in this state, the rotating shaft 43 of the motor 40 is directly braked, so that the brake 60 exhibits effective braking performance.

On the other hand, when the clutch controller 77 is manipulated with the brake 60 actuated to disconnect the rotating shaft 43 of the motor 40 from the brake 60 by the clutch mechanism 70, the brake 60 exerts no braking force on the drive wheel 80 but the dynamic braking force of the motor 40 acts on the wheel. Accordingly, even if the brake 60 is disconnected by manipulating the clutch controller 77 on a downward slope or the like in error, the drive wheel 80 is unlikely to become accelerated over a given level. Further because the brake 60 can be disconnected by the clutch controller 77, the help need not turn on the power source for the electric wheelchair 10 when pushing the wheelchair 10 manually.

Although FIG. 1 shows the clutch controllers 77, 77 as provided respectively on the left and right handles 19, 19 to be held by the help, the controller 77 may be provided on only one handle for operating both the clutch mechanisms 70, 70. The controller 77 is not limited only to the structure comprising the push rod 76 or wire 77a.

Furthermore, the controller 77 may be made accessible by the user of the electric vehicle.

With the control device 18 of the present invention, the axle 22 supporting the drive device 20 thereon, the rotating shaft 43 of the motor 40 and the clutch mechanism 70 are arranged in alignment. This arrangement makes the drive device 20 itself compact (up to 15 cm in diameter), further making it possible to give a smaller diameter to the drive wheel 80 to be provided around the outer periphery of the drive device 20. The arrangement wherein the rotating shaft 43 and the drive wheel 80 have the same center of rotation obviates unbalanced reaction, enabling the axle 22 as aligned with the shaft 43 to receive the reaction in good balance.

Furthermore, the electromagnetic brake 60 and the clutch mechanism 70 are provided closer to the axle 22 than the motor 40. This arrangement wherein the brake 60 and the clutch mechanism 70 are positioned toward the axle 22 serves to simplify the wiring 24 for the electromagnetic brake 60 and facilitate the provision of the push rod 76 for manipulating the clutch mechanism 70, rendering the drive device more efficient to maintain.

Second Embodiment

Figure 9:
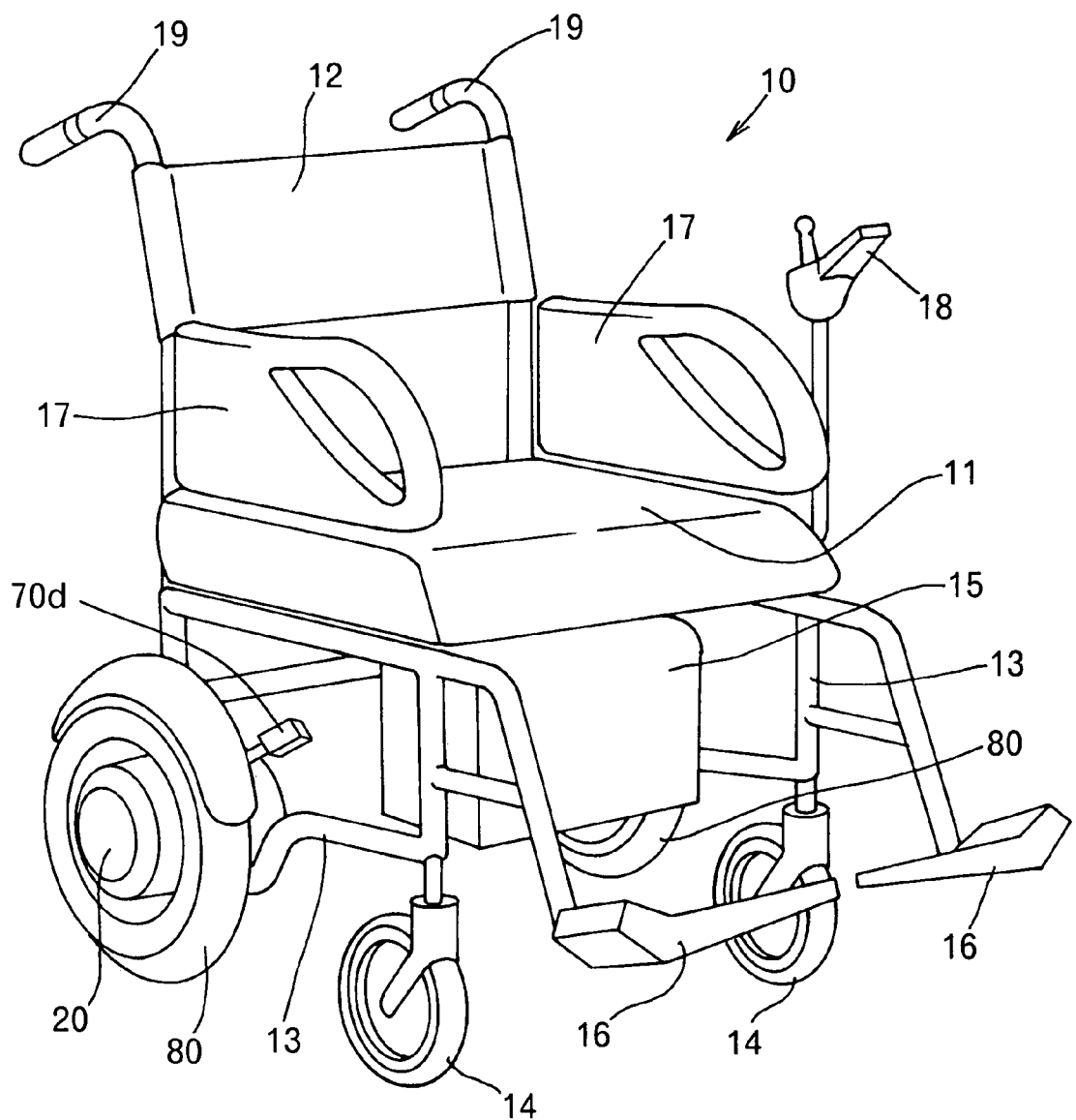
FIG. 9 is a perspective view of an electric wheelchair of a second embodiment of the invention.

FIG. 9 is a perspective view of an electric wheelchair 10 wherein a drive device 20 of the invention is provided for each of drive wheels 80, 80 at opposite sides thereof. Throughout the drawings, like parts are designated by like reference numerals and will not be described repeatedly.

Figure 10:
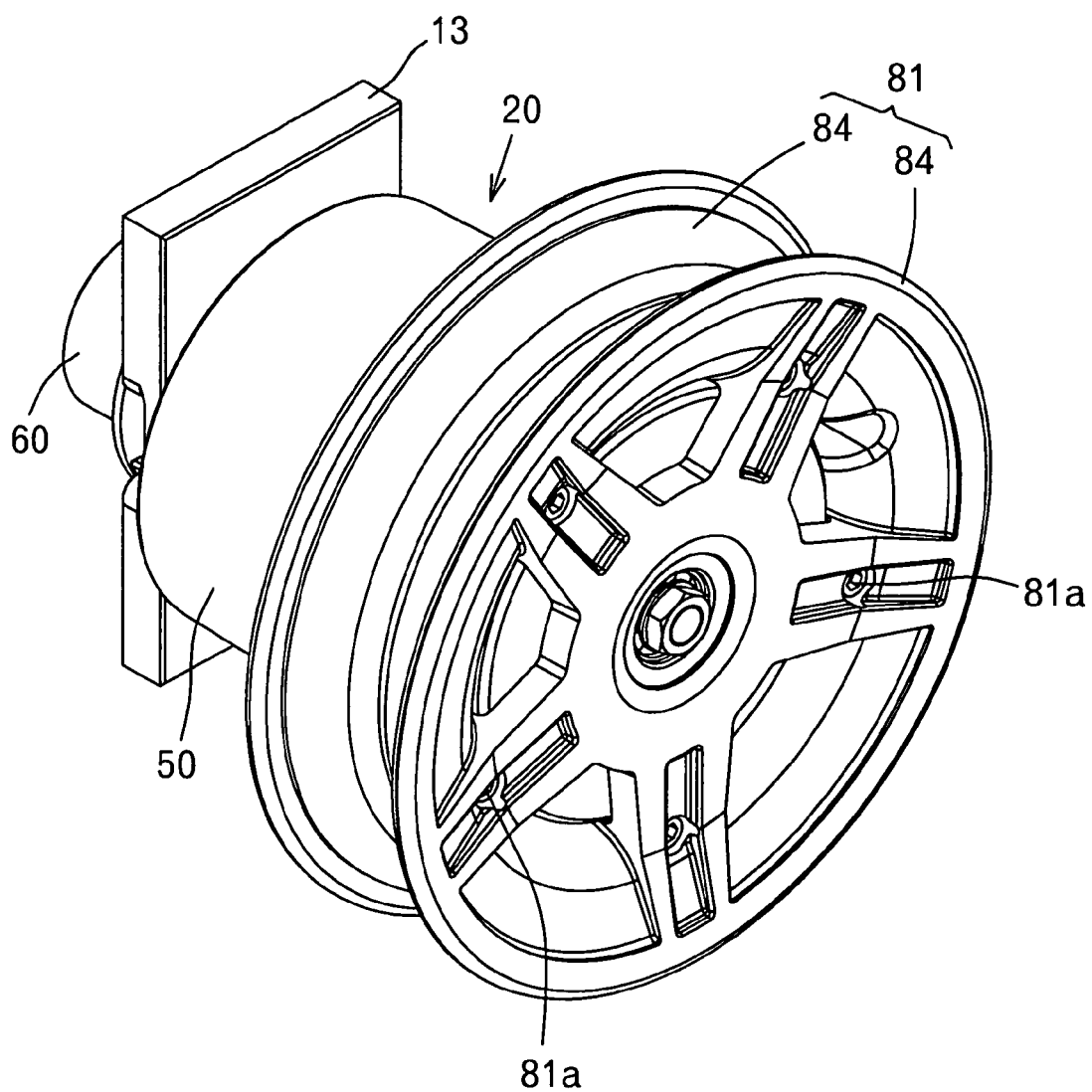
FIG. 10 is a view in section of a drive device according to the second embodiment.
Figure 12:
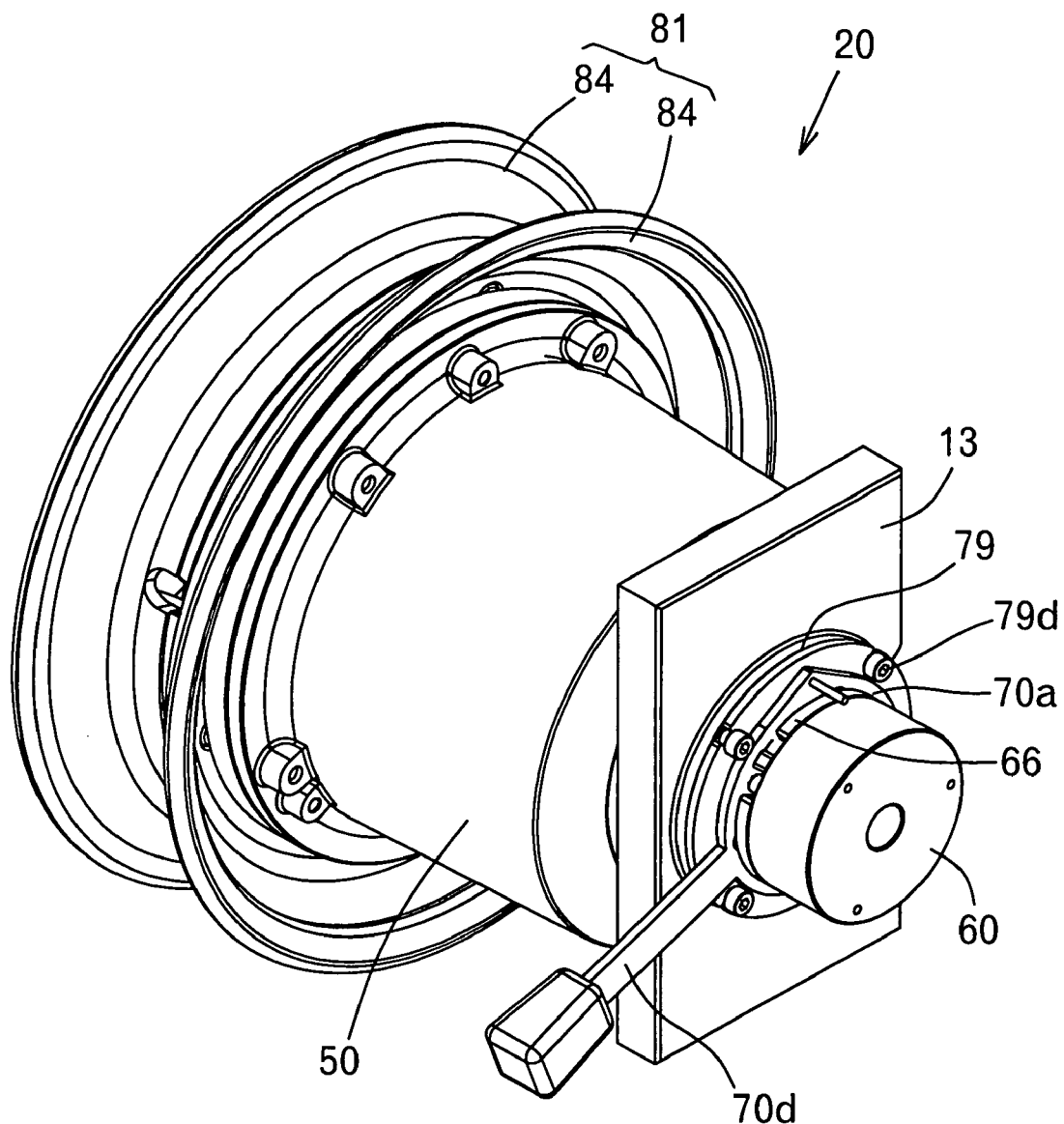
FIG. 12 is a perspective view of FIG. 10 as the device is seen from opposite direction.
Figure 13:
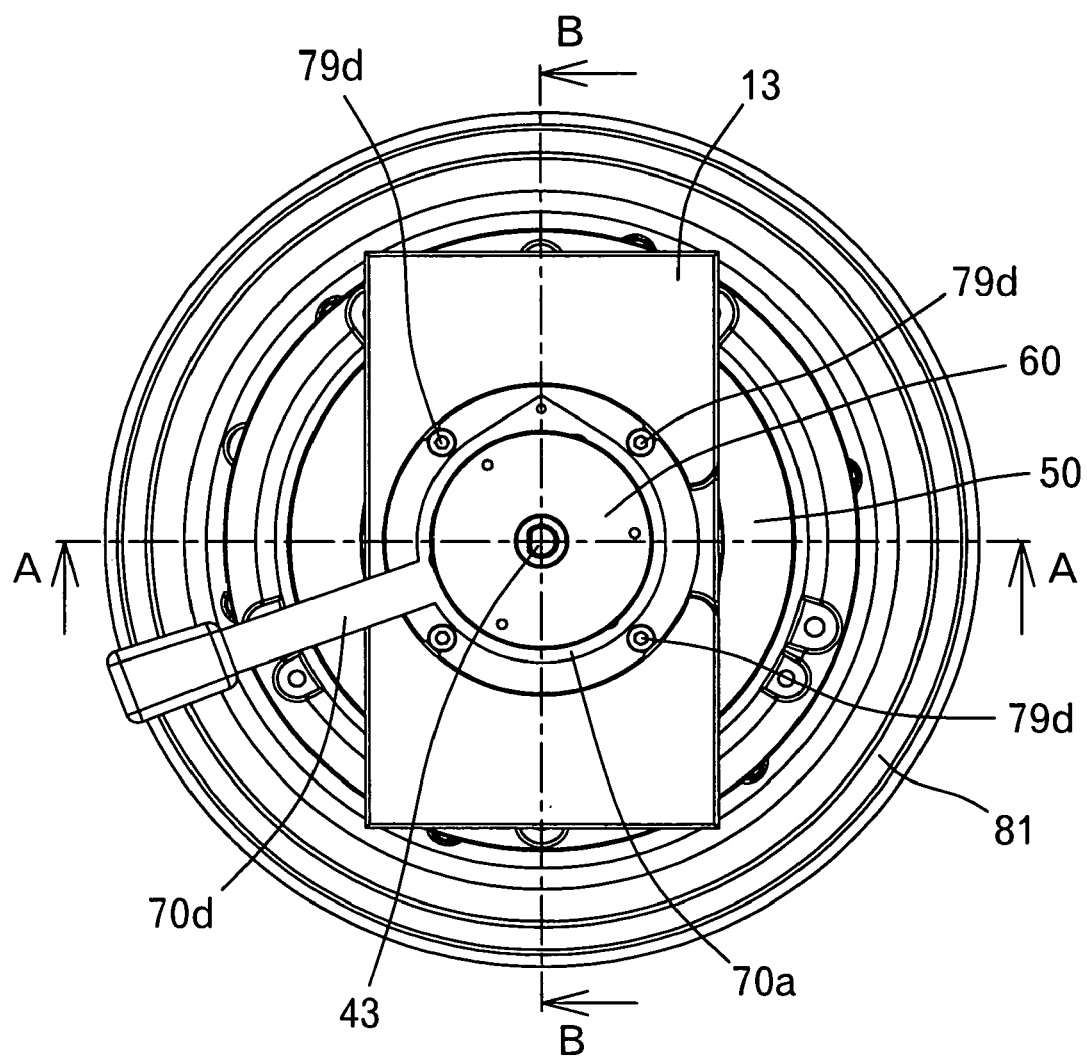
FIG. 13 is a rear view of the drive device according to the second embodiment.

FIG. 10 is a perspective view of the drive device 20 of the invention which is mounted on a frame 13 of the electric vehicle, FIG. 11 is a front view of the drive device 20, FIG. 12 is a perspective view of FIG. 10 as the device is seen from the opposite direction, and FIG. 13 is a rear view. A tire provided around a wheel member 81 of the drive wheel 20 is not shown in these drawings.

With reference to the drawings, the drive device 20 of the invention has a housing 50, the outer end wall of which has fixed thereto the wheel member 81 of the drive wheel 80 with screws. An electromagnetic brake 60 provided with a clutch mechanism 70 is disposed on the other side of the frame 13.

Figure 14:
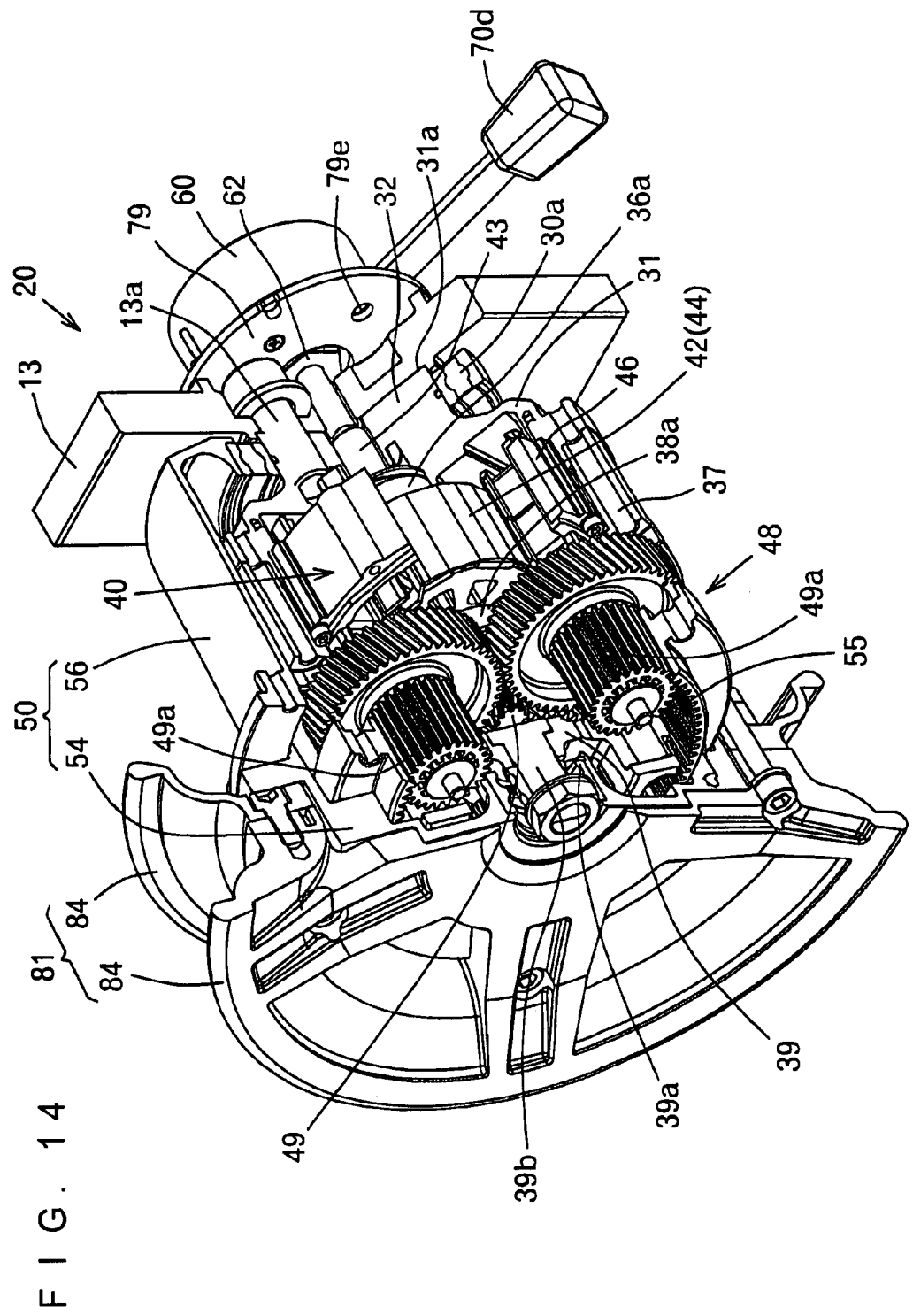
FIG. 14 is a perspective view partly in section and of the drive device of the second embodiment.
Figure 16:
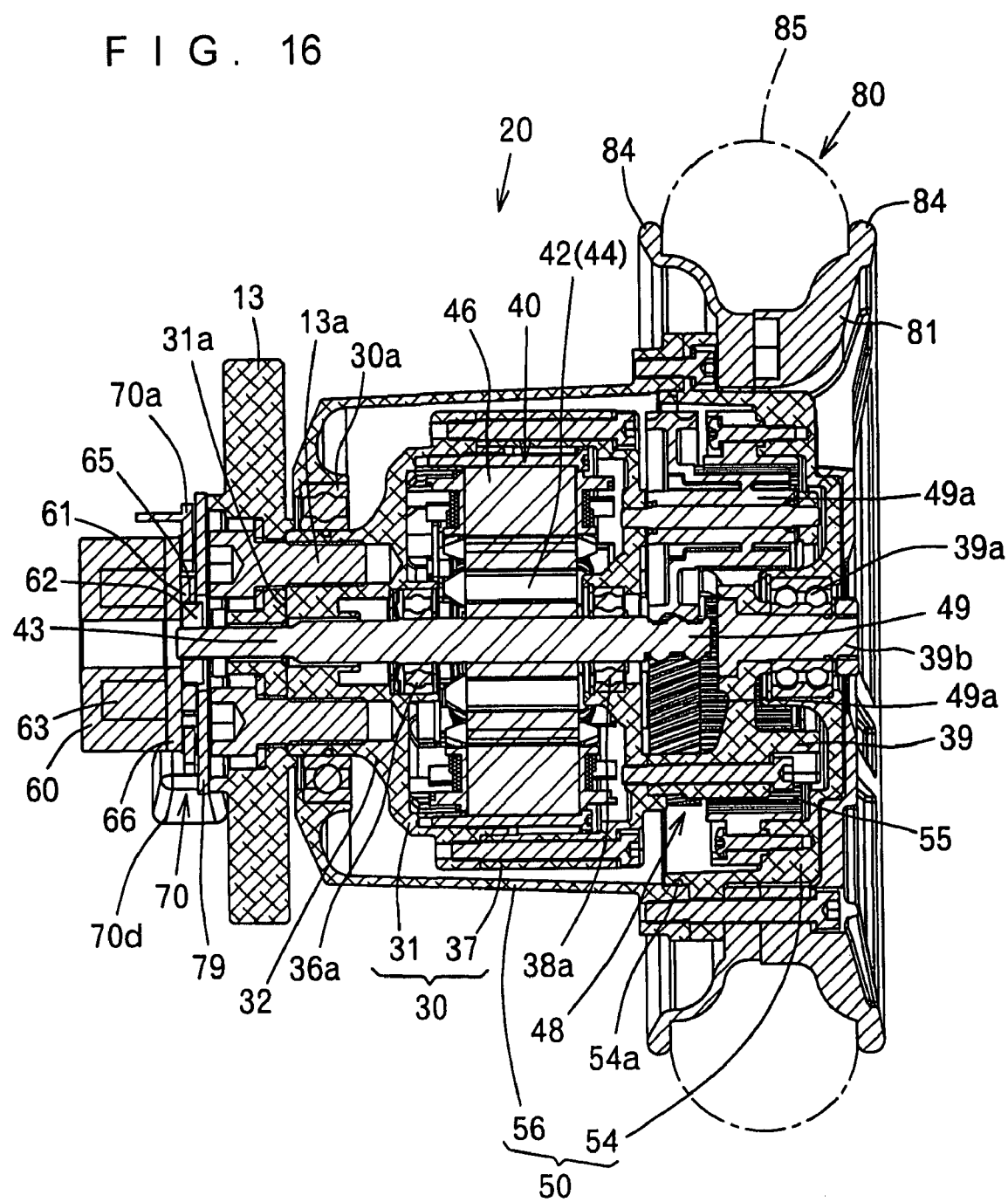
FIG. 16 is a view in section taken along the line B-B in FIG. 13.

FIG. 14 is a perspective view partly in section and showing the drive device 20 of the invention, and FIGS. 15 and 16 are views in section taken respectively along the line A-A and the line B-B in FIG. 13.

With reference to these drawings, the drive device 20 comprises, as positioned externally of the frame 13 of the electric wheelchair 10, a casing 30 fixedly attached to the frame 13 with bolts 13a, a motor 40 housed in the casing 30, a reduction gear mechanism 48 disposed toward the outer end of the casing 30, a housing 50 covering the casing 30 and the drive wheel 80 provided around the outer periphery of outer end of the housing 50. The electromagnetic brake 60 provided with the clutch mechanism 70 is disposed inwardly of the frame 13.

The casing 30 has an inner casing member 31 closed at a base end thereof, and an outer casing member 37 closing the inner casing member 31. The inner casing member 31 has at its base end a mount wall 31a fastened to the frame 13 with the bolts 13a, 13a and is thereby supported at its one end by the frame 13. The motor 40 is provided in the inner casing member 31.

The motor 40, which is provided inside the inner casing member 31, comprises a stator 46 fastened to the inner casing member 31 with screws, and a rotor 42 disposed in the center of the stator 46. A rotating shaft 43 extends through the center of the rotor 42.

The rotating shaft 43 is rotatably supported by bearings 36a, 38a which are arranged in the inner casing member 31 and outer casing member 37 respectively and has an outer end projecting from the outer casing member 37 and meshing with the reduction gear mechanism 48 to be described later. The rotating shaft 43 has a base end projecting outward from the inner casing member 31 and including an end portion of reduced diameter. This shaft end portion extends through the frame 13 into the clutch mechanism 70. A detailed description will be given later.

The reduction gear mechanism 48 can be, for example, a planetary gear mechanism. The gear mechanism 48 comprises a gear formed at the outer end of the rotating shaft 43 and serving as a sun gear 49. Meshing with the sun gear 49 are a plurality of planetary gears 49a, 49a, which are provided between and supported by the outer casing member 37 and the holding plate 39 screwed to the outer surface of outer end of the outer casing member 37.

To obtain an increased output and reduction effect, the planetary gears 49a, 49a each comprise a double gear having two gears of different sizes. The large gear at the base end is in mesh with the sun gear 49, The small gear at the outer end is in mesh with an internal gear 55 fastened with screws to an outer housing member 54 to be described later.

When the rotor 42 is rotated by energizing the stator 46, a drive force is delivered to the housing 50 via the reduction gear mechanism 48 and the internal gear 55 to rotate the housing 50.

The housing 50 comprises an inner housing member 56 positioned toward the frame 13 and supported by a bearing 30a on the inner casing member 31. The inner housing member 56 has an outer-end opening, which is closed with the outer housing member 54 to provide the housing 50. An O-ring 54a is provided between the inner housing member 56 and the outer housing member 54 to afford enhanced waterproofness.

As described above, the internal gear 55 is fastened to the outer housing member 54 with screws. The outer housing member 54 is rotatably supported by a bearing 39a on a shaft 39b projecting from the center of the holding plate 39.

The drive wheel 80 can be composed of the-above-mentioned wheel member 81 fitting around the housing 50 and rotatable therewith, and a rubber tire 85 fitting around a rim 84 of the wheel member 81.

In the case where a solid tire is used as the tire 85, it is desirable to provide the rim 84 in the form of two divided segments as shown in FIGS. 14 to 16 and to fasten the wheel member 81 to the outer housing member 54 with bolts 81a, 81a, with the solid tire fitted in between the divided rim segments.

Preferably, the drive wheel 80 is so positioned that the drive device 20 will not project outward beyond the tire 85.

Wiring 24 for use in passing current though the stator 46 is led through an end plate 32 of the inner casing member 31 as indicated at 32a and then through a bore 13b in the frame 13 and extends to a control box 15 on the bottom wall of the seat 11.

The rotor 42 of the motor 40 comprises the rotating shaft 43 supported by the bearings 36a, 38a, and a stack of metal plates 44 fitted to the rotating shaft 43 so as to be opposed to the stator 46.

The outer end of the rotating shaft 43 is in mesh with the reduction gear mechanism 48. The rotation of the shaft 43 is delivered to the drive wheel 80 by way of the reduction gear mechanism 48.

As shown in FIG. 12, the portion of the rotating shaft 43 inserted through the frame 13 extends into the electromagnetic brake 60, and the shaft base end is disengageably connected to an inner driver 62 of the brake 60.

Figure 17:
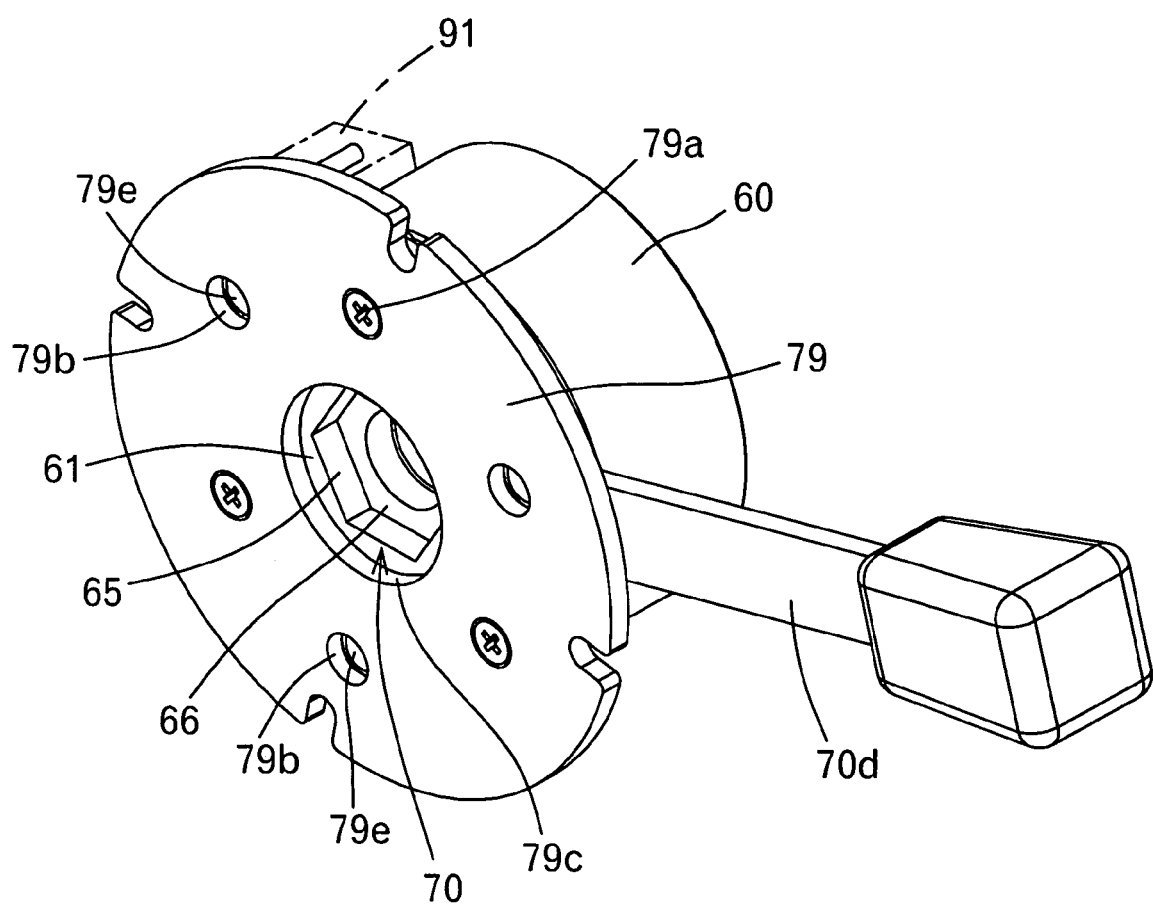
FIG. 17 is a perspective view of an electromagnetic brake and clutch mechanism.
Figure 19:
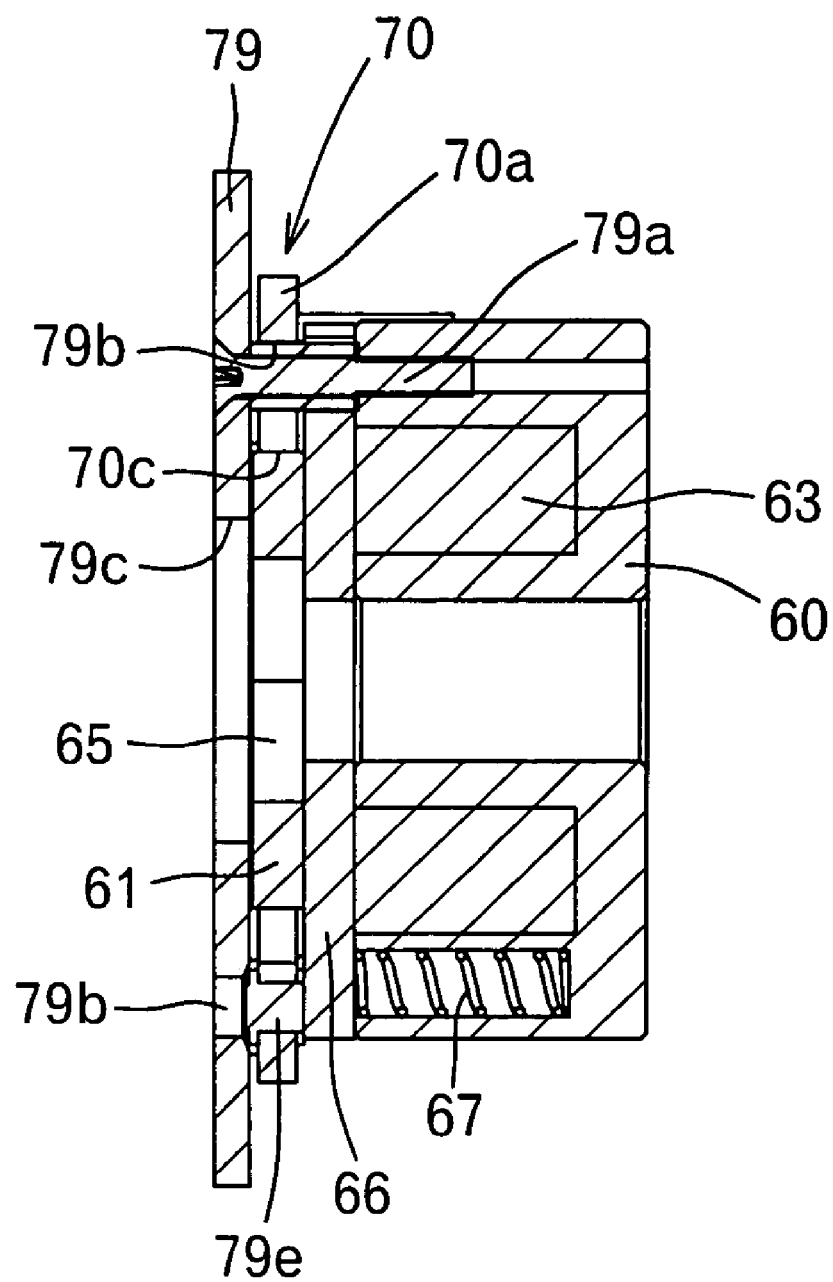
FIG. 19 is a view in section taken along the line A-A in FIG. 18.

FIG. 17 is a perspective view of the electromagnetic brake 60 provided with the clutch mechanism 70, FIG. 18 is a front view of the same, and FIG. 19 is a view in section taken along the line A-A in FIG. 18. The rotating shaft 43 and the inner drive 62 are not shown in FIGS. 17 and 19. As shown in the foregoing FIG. 15, the base end of the rotating shaft 43 of the motor 40 has a reduced diameter and is D-shaped in cross section by machining. The base end of the rotating shaft 43, which is D-shaped in cross section, fits in the inner driver 62 of the clutch mechanism 70 idly nonrotatably and is rotatable with the inner driver 62. The inner driver 62 has an outer periphery which is polygonal in shape, and is idly nonrotatably fits in a bore 65 of the same shape formed in the center of a brake disk 61 of the brake 60.

The clutch mechanism 70 has a clamp plate 79 provided with a circular hole 79c, through which the rotating shaft 43 loosely extends. The plate 79 is attached to the electromagnetic brake 60 with a plurality of screws 79a, 79a, with a predetermined clearance formed therebetween. The clamp plate 79 has a plurality of receiving holes 79b, 79b for elastic blocks 79e, 79e of rubber or the like on a clutch control plate 70a (to be described next) to disengageably engage in. The clamp plate 79 is screwed to the frame 13 as indicated at 79d.

The clutch control plate 70a, which is annular and has a lever 70d projecting therefrom, fits in the clearance between the clamp plate 79 and the brake 60. In thickness, the clutch control plate 70a is smaller than the clearance and the brake disk 61. The control plate 70a has slits 70b, 70b at the positions corresponding to the respective screws 79a, 79a on the clamp plate 79 so as to be pivotally movable circumferentially. The control plate 70a has at its center a hole 70c for the brake disk 61 to fit in rotatably.

The elastic blocks 79e, 79e are attached to the clutch control plate 70a. When fitting in the receiving holes 79b, 79b of the clamp plate 79, the blocks 79e, 79e permit an armature 66 of the brake 60 to slide, but when the control plate 70a is turned by manipulating the lever 70d, the elastic blocks 79e, 79e are disengaged from the receiving holes 79b, 79b, offering resistance between the clamp plate 79 and the armature 66 to block the sliding movement of the armature 66.

As in the first embodiment, the electromagnetic brake 60 can be, for example, a brake which is actuated in an unenergized state. When the brake is energized, current is passed through a coil 63 to deactivate the brake. When the brake is unenergized, the slidable armature is forced by springs 67, 67 to exert pressure on the brake disk 61 to directly brake the rotating shaft 43. In this way, the brake is activated when unenergized.

To enable the user to visually recognize the state of the clutch mechanism 70, a microswitch 91 for detecting the rotation of the clutch control plate 70a may be provided, for example, on the clamp plate 79 as shown in FIG. 17 for a display 92 (to be described later) to show the state of the clutch mechanism 70.

Figure 20:
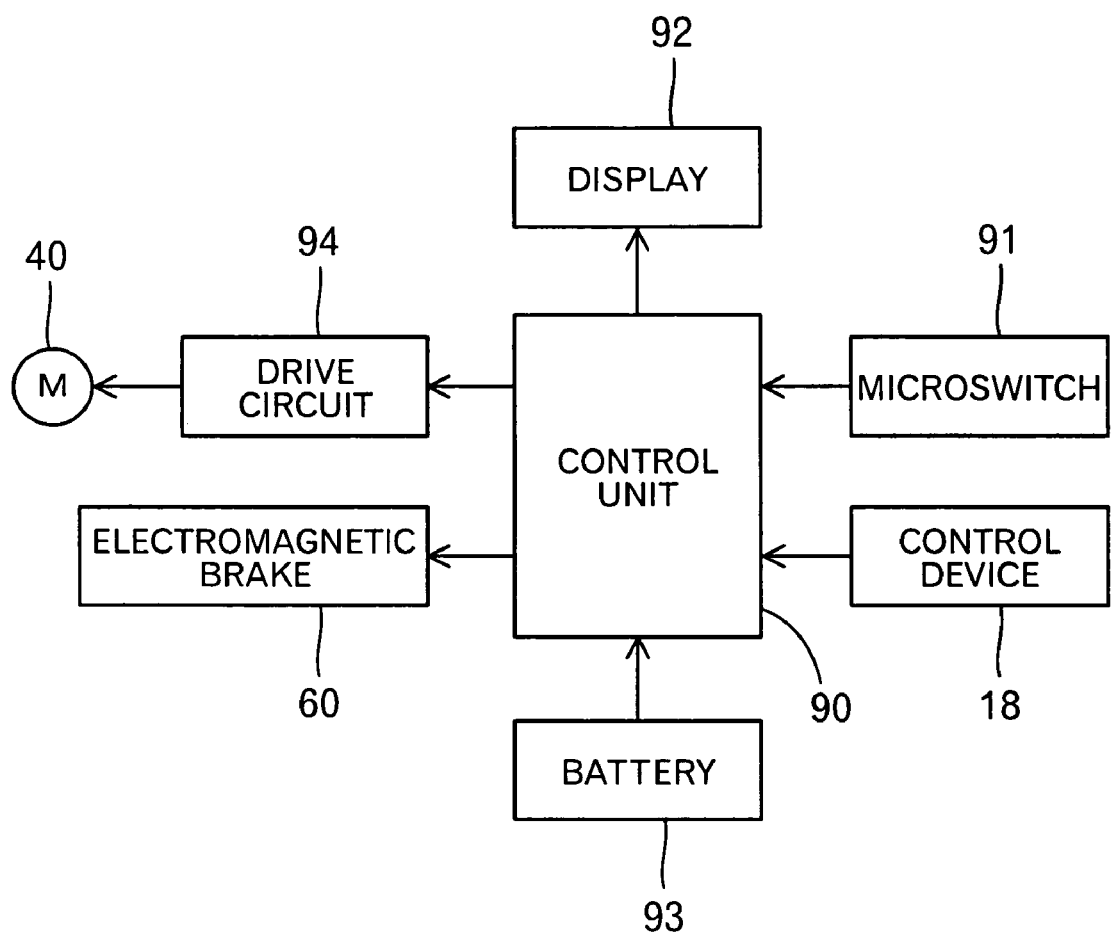
FIG. 20 is a block diagram of control means.

FIG. 20 is a block diagram showing control means for the electric vehicle drive device 20 of the present invention. With reference to FIG. 20, all control procedures for the drive device 20 are performed by a control unit 90 comprising a CPU. Connected to the control unit 90 are the control device 18 such as a joystick, microswitch 91 for detecting the state of the clutch mechanism 70, display 92 for showing various items of information, electromagnetic brake 60, battery 93 and motor 40 via a drive circuit 94. The control unit 90 and the battery 93 can be arranged in the control box 15.

In response to control commands from the control device 18, the control unit 90 controls the forward rotation, reverse rotation or stop of opposite drive devices 20 and the energization of each electromagnetic brake 60. The information to be shown on the display 92 includes the state of the clutch mechanism 70 as detected and notified by the microswitch 91, state of energization of the brake 60, the power remaining in the battery 93, distance and speed of travel, etc.

When the user or help manipulates the lever 70d on the electric wheelchair having the drive device 20 of the invention, the clutch control plate 70a rotates, moving the elastic blocks 79e out of the receiving holes 79b and causing the blocks 79e, 79e to serve as resistance between the clamp plate 79 and the armature 66 to depress the armature 66 and render the brake disk 61 free to rotate. Consequently, the brake 60 ceases acting on the rotating shaft 80 regardless of whether the brake 60 is energized or unenergized.

According to the present invention, however, the rotating shaft 43 of the motor 40 is connected to the drive wheel 80 at all times. Even while the brake 60 is not acting on the drive wheel 81, the motor 40, when in the energized state, therefore acts as a generator, supplying DC current to the control box 15 for regenerative braking, that is, applying dynamic braking force on the drive wheel 80 as a load. The wheel 80 accordingly fails to become free to rotate. As a result, even if the brake 60 is held out of operation by manipulating the clutch mechanism 70, the drive wheel 81 will rotate under a given load of resistance and is unlikely to become accelerated, for example, on a downward slope.

At this time, the control unit 90 of the control box 15 is so adapted as to judge an increase or decrease in speed by detecting the rotational speed of the drive wheel 80 with an unillustrated speedometer. If an increase in speed is recognized as a result of judgment, the control means of the control box 15 short-circuits the wiring of the stator 46 further increasing the additional resistance of the motor for short-circuit braking to give an enhanced braking force. Even if the control means of the control box 15 still recognizes an increase in the speed detected by the speedometer, the motor 40 is so driven as to reverse the rotation for plugging. In accordance with the speed, the drive wheel may be subjected to multistage braking in this way for a speed reduction.

When the clutch mechanism 70 is manipulated to disconnect the electromagnetic brake 60 as actuated, the drive wheel is released from the braking force of the brake 60, so that the clutch mechanism 70 can be utilized also when the wheelchair is pushed forward by the help manually.

When the lever 70d is manipulated again to rotate the clutch control plate 70a and engage the elastic blocks 79c in the receiving holes 79b, with the brake 60 disconnected from the rotating shaft 43, the armature 66 becomes slidable. If the brake 60 is deenergized, the armature 66 slidingly moves by being biased by the springs 67, 67, permitting the brake disk 61 to be held between the clamp plate 79 and the armature 66. The brake 60 is activated to arrest the rotation of the rotating shaft 43 and prevent the rotation of the drive wheel 80.

When the user gives a command to advance, retract or turn the electric wheelchair 10 by the control device 18, each electromagnetic brake 60 is energized and thereby deactivated, and each stator 46 is energized to rotate the rotor 42. When the rotor 42 is rotated, a drive force is delivered from the rotating shaft 43 to the housing 50 by way of the reduction gear mechanism 48 and the internal gear 55 to rotate the housing 50. This rotates the drive wheel 80 secured to the housing 50. Thus, the electric wheelchair 10 is advanced or retracted. The wheelchair 10 is turned by varying the rotational speeds of the left and right drive devices 20.

When the electromagnetic brake 60 is actuated while the clutch mechanism 70 is not manipulated by the help, the rotating shaft 43 of the motor 40 is directly braked, so that the brake 60 exhibits effective braking performance.

On the other hand, when the lever 70d is manipulated, causing the clutch mechanism 70 to disconnect the rotating shaft 43 of the motor 40 from the brake 60 as actuated, the brake 60 exerts no braking force on the drive wheel 80 but the dynamic braking force of the motor 40 acts on the wheel. Accordingly, even if the brake 60 is disconnected by manipulating the lever 70d on a downward slope or the like in error, the drive wheel 80 is unlikely to become accelerated over a given level. Further because the brake 60 can be disconnected by the clutch controller 77, the help need not turn on the power source for the electric wheelchair 10 when pushing the wheelchair 10 manually.

With the drive device 20 of the present invention, the shaft 39b projecting from the center of the holding plate 39 may be cause to extend through the outer housing member 54 so that the casing can be supported at opposite ends thereof.

Further according to the present embodiment, the drive device is the frame 13 of the electric vehicle is made to directly support the drive device 20, whereas it is of course possible to use an independent bracket or the like as the frame 13 shown, for example, in FIG. 10 and to fasten the bracket or like member to the vehicle frame 13 with bolts.

Apparently, the present invention can be altered or modified by one skilled in the art without departing from the spirit of the invention. Such a modification is included within the scope of the invention as set forth in the appended claims.

What is claimed is:

1. A drive device for electric vehicles comprising:
   a casing supported at one end thereof by an axle on the electric vehicle,
   a motor housed in the casing and having a rotating shaft of the motor disposed in alignment with the axle,
   a housing rotatably fitting around an outer periphery of the casing and coupled to an outer end of the rotating shaft of the motor by a reduction gear mechanism,
   a drive wheel provided around an outer periphery of the housing, and
   an electromagnetic brake for arresting the rotation of the rotating shaft of the motor at a base end of the shaft,
   a clutch mechanism being disposed between the rotating shaft of the motor and the electromagnetic brake for engaging the rotating shaft with the brake or disengaging the shaft from the brake.

2. The drive device for electric vehicles according to claim 1 wherein the clutch mechanism has a movable piece for connecting the rotating shaft of the motor to the electromagnetic brake so as to transmit power thereto, and the movable piece is slidable axially thereof and biased toward the axle so as to connect the rotating shaft to the brake.

3. The drive device for electric vehicles according to claim 2 wherein the movable piece is fitted to the rotating shaft of the motor so as to be rotatable therewith and slidable thereon.

4. The drive device for electric vehicles according to claim 3 wherein the movable piece has a tubular portion fitting around the rotating shaft and provided with a splined inner surface, and the rotating shaft of the motor has at the base end thereof a splined shaft portion in engagement with the splined inner surface.

5. The drive device for electric vehicles according to claim 2 wherein the movable piece has an outer periphery engageable with or disengageable from the electromagnetic brake.

6. The drive device for electric vehicles according to claim 2 wherein the axle has a bore axially extending therethrough and provided with a push rod slidably axially thereof, the push rod being axially slidable to thereby cause an outer end thereof to slide toward a direction to disconnect the rotating shaft from the housing against the biasing force of the biasing means.

7. The drive device for electric vehicles according to claim 1 wherein a braking force to be exerted by the motor on the drive wheel is made variable in accordance with the speed of rotation of the motor, with the drive wheel made free of the braking force of the electromagnetic brake by disengaging the clutch mechanism.

8. An electric wheelchair having an electric vehicle drive device according to claim 1 on each of opposite sides thereof.

9. A drive device for electric vehicles comprising:
   a casing,
   a motor housed in the casing and having a rotating shaft,
   a housing rotatably fitting around an outer periphery of the casing and coupled to an outer end of the rotating shaft of the motor by a reduction gear mechanism,
   a drive wheel provided around an outer periphery of the housing, and
   an electromagnetic brake for arresting the rotation of the rotating shaft of the motor at a base end of the shaft,
   a clutch mechanism being disposed between the rotating shaft of the motor and the electromagnetic brake for engaging the rotating shaft with the brake or disengaging the shaft from the brake,
   wherein the casing is attached to a frame of the electric vehicle, the rotating shaft of the motor rotatably projecting from the casing, and the motor rotating shaft extends through the vehicle frame when the casing is attached to the vehicle frame, the electromagnetic brake and the clutch mechanism being mounted on the portion of the rotating shaft extending through the vehicle frame and projecting outward beyond the frame.

10. The drive device for electric vehicles according to claim 9 wherein the clutch mechanism is provided with a lever for effecting a change-over between transmission of power between the rotating shaft and the brake and interruption of the power transmission.

11. The drive device for electric vehicles according to claim 9 wherein the casing is supported at one end thereof by the frame of the electric vehicle, the base end of the motor rotating shaft extending through the casing and the vehicle frame and projecting outward beyond the frame, the electromagnetic brake being disposed toward the base end of the rotating shaft, the clutch mechanism being provided between the electromagnetic brake and the rotating shaft for engaging the rotating shaft with the brake or disengaging the shaft from the brake.

12. The drive device for electric vehicles according to claim 11 wherein the clutch mechanism is provided with a lever for effecting a change-over between transmission of power between the rotating shaft and the brake and interruption of the power transmission.

13. An electric wheelchair having an electric vehicle drive device according to claim 9 on each of opposite sides thereof.

* * * * *